April 5, 1927.

F. L. FULLER 1,623,722

CASH REGISTER

Original Filed Oct. 13, 1922    5 Sheets-Sheet 1

WITNESS

INVENTOR
Frederick L. Fuller
BY
ATTORNEYS

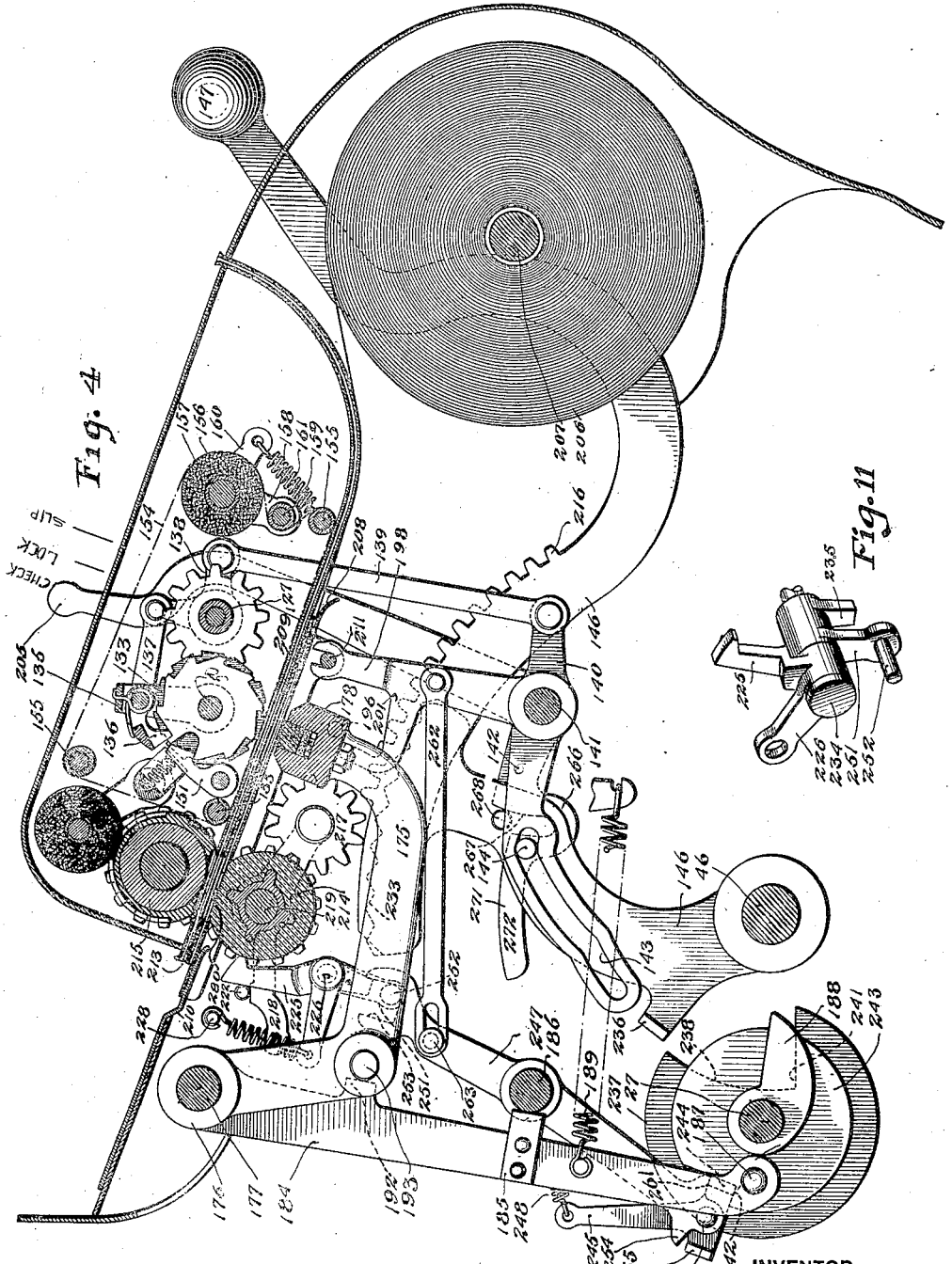

April 5, 1927.  
F. L. FULLER  
CASH REGISTER  
Original Filed Oct. 13, 1922 5 Sheets-Sheet 5  
1,623,722
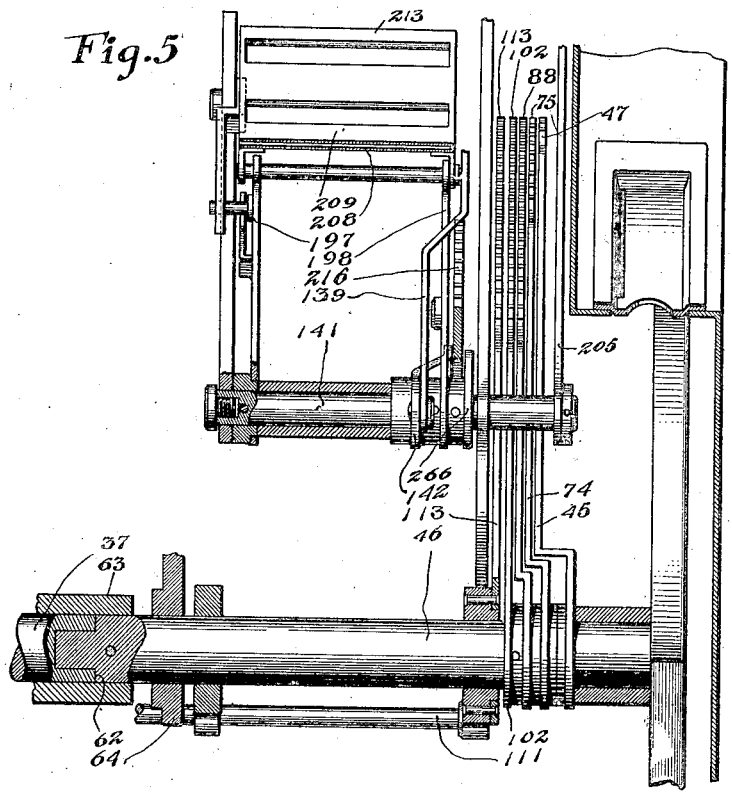
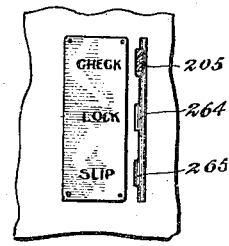
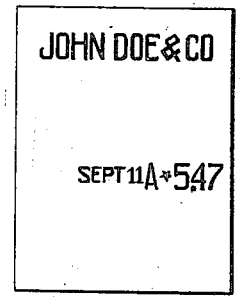
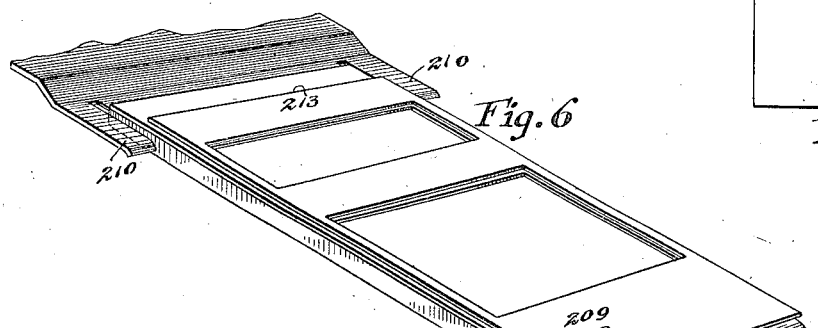
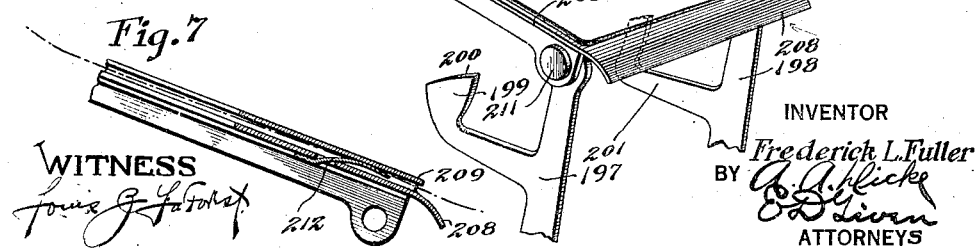
INVENTOR  
Frederick L. Fuller  
BY  
ATTORNEYS Patented Apr. 5, 1927.

1,623,722

UNITED STATES PATENT OFFICE.

FREDERICK L. FULLER, OF ILION, NEW YORK, ASSIGNOR TO REMINGTON ARMS COMPANY, INC., A CORPORATION OF DELAWARE.

CASH REGISTER.

Application filed October 13, 1922, Serial No. 594,296. Renewed July 28, 1926.

This invention relates generally to improvements in cash registers and has particular reference to improvements in the printing mechanisms of such machines.

In the accompanying drawings the improvements are shown applied to a machine of the same general type as is shown and described in U. S. application, Serial Number 263,125, filed Nov. 19, 1918, by Frederick L. Fuller, and U. S. application, Serial Number 542,671, filed Mar. 10, 1922 by Fred S. Haas. As will be more clearly apparent later on, however, the improvements are capable of being applied to or embodied in a number of other forms of cash registers and accounting machines without departing from the spirit of the invention.

Broadly, the object of the present invention is the provision of means whereby, if, through an anomalous operation of the machine, a record of the transaction is printed upon a check contained within the machine, this impression will be rendered illegible upon a subsequent operation of the machine and the record of the new transaction printed in the normal manner.

More specifically the object of the present invention is to provide a control lever for printing either upon an inserted slip or ejected strip, and if for any reason whatsoever, the machine be operated with the control lever in the slip printing position and without a slip inserted, the check paper will be positioned in such a manner that the impression made thereon will be obliterated during the next operation of the machine when the machine has been conditioned for printing on checks. The record of the transaction of the last operation will be printed in the usual manner, thus preventing confusion in the event that the records of more than one transaction appear upon an ejected check.

The mechanism devised for effecting these various results is, however, capable of being used for other purposes, either as a whole or in part, and the statement of the objects is not intended as a limitation in this respect. For example the mechanism herein disclosed for shifting the paper, or equivalents of it, might be used to draw the paper out of feeding relation with the feeding mechanism in machines where the feeding mechanism is operated and it is desirable to prevent the paper from being fed.

With the above and other objects in view, the invention consists in the novel combination and arrangement of parts, the features of novelty of which are pointed out in appended claims, and a preferred embodiment of which is shown in the accompanying drawings.

Of said drawings:—

Fig. 4 is a section through the printing mechanism taken on the line 4—4 of Fig. 3.

Fig. 5 is a front view of a portion of the type carrier setting connections and some of the check paper supporting mechanism.

Fig. 6 is a detail of the check paper chute or table and some of the connections for imparting movement to it.

Fig. 7 is a partial vertical section through the device shown in Fig. 6.

Fig. 8 shows one of the checks issued by the machine and how the machine overprints to obliterate or conceal impressions accidentally made on the check strip when the printing mechanism is operated under sales slip printing condition.

Fig. 9 shows the appearance of a check bearing an imprint of a transaction when the control lever is in the slip printing position and no slip has been inserted.

Fig. 10 is a top plan view of the machine showing the control lever and associated index plate.

Fig. 11 is a detail in perspective of a part of the full stroke mechanism and one of the aligning devices for holding the check feeding mechanism in correct operating relation with certain other of the parts.

Figure 1:
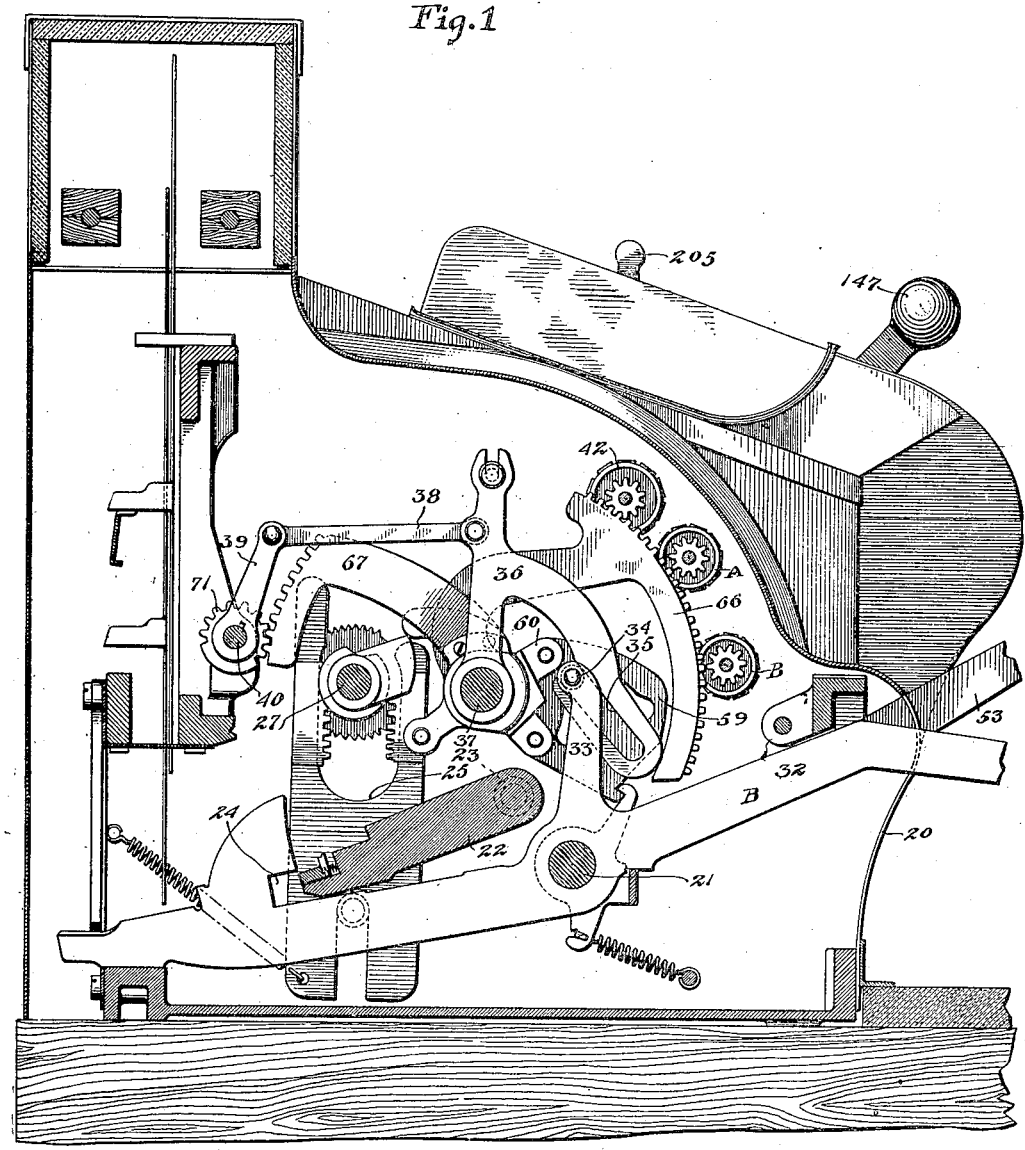
Fig. 1 is a vertical transverse sectional view of the illustrative machine.

As shown in the drawings, the machine used to illustrate one embodiment of the invention is of the key operated type, that is, various functions, such as, indicating, registering, and printing are effected directly by operation of the keys. Addition of the present improvements does not materially affect the operation of such a machine in any of these respects, but when the keys are operated type carriers forming a part of the new mechanism are adjusted to represent the keys and impressions are then taken from the type carriers upon either a check strip or upon a sales slip depending upon which kind of printing the mechanism has been prepared to do.

In case the mechanism has been prepared or conditioned for check printing, after the keys have been operated and the characters representing them printed on the check strip a lever or handle is operated to feed a portion of the check strip containing the record of the keys operated to a position where it may be severed from the strip. The feeding operation is performed by a pair of co-operating rollers driven by the handle, one of which rollers is provided with inked type for printing advertising or other matter on the face of the check.

For certain classes of transactions, such as "charge" transactions, it is desirable to have the machine so constructed as to print upon an itemized "Charge" slip a total of the items, thereby providing a way of insuring the making of a record of the transaction in the record retaining devices of the machine. The improved machine is provided with a slot into which sales slips may be inserted to receive impressions, provided that the mechanism has been prepared for sales slip printing. If it has not been so prepared the slot will be closed by an obstruction which prevents insertion of a slip, but this obstruction is automatically removed as an incident to conditioning the machine for printing upon sales slips.

In the present embodiment the work of conditioning the printer for different kinds of printing is performed by adjustment of manipulative devices comprising a lever which operates through suitable connections to lock the check feeding mechanism, withdraw the obstruction from the sales slip slot, and disable or render ineffective interlocking mechanism controlling the sequence of operation of the keys and the check feeding and printing mechanism.

The interlocking mechanism just referred to is so constructed that after a key or keys have been operated to print upon a check a second operation of the keyboard cannot be performed unless the check feeding mechanism is first operated. Operation of the feeding mechanism will affect the interlocking mechanism to free the keys for operation, but freeing them will at the same time affect the interlocking mechanism to prevent a second operation of the check feeding mechanism without an intervening operation of the keyboard.

Adjustment of the mechanism in preparation for slip printing frees the keys for successive operations without intervening operations of the check feeding mechanism. In fact, the feeding mechanism becomes locked so that it cannot be actuated. To print upon sales slips when the mechanism is in slip printing condition, all that is necessary is to insert the slips to a position where they may receive impressions from the type carriers and then depress the keys representing the items. This causes the items to be printed upon the slips, after which the slips are simply withdrawn from the machine.

The mechanism for controlling the condition of the printing mechanism is so constructed that it may be adjusted not only to prevent insertion of a sales slip, but also at the same time to prevent operation of the mechanism usually operated to print upon checks or sales slips. The reason for this is that it may at times be desirable to operate the keys of the machine without either issuing checks or printing upon sales slips. When in this non-printing condition the interlocking mechanism before referred to is thrown out of commission so that there is no interference with repeated or successive operations of the keyboard.

When the mechanism is operated under check printing conditions, a pair of impression hammers is operated to make the impression, one for printing the consecutive numbers and the other to print the date and description of the item. When the mechanism is adjusted to the non-printing condition both of the impression hammers are inoperative, while under slip printing conditions only the consecutive number impression hammer fails to operate. Under the condition last mentioned, therefore, the consecutive number type carriers do not print upon the inserted slips, and as the consecutive numbering devices are operated to add one directly by movement of the check feeding devices the number cannot be changed or increased, because it will be recalled, the feeding mechanism becomes locked when the printing mechanism is prepared for slip printing.

The feeding operation is as before stated, performed by a pair of co-operating rollers driven by a lever or handle, one of which rollers is provided with inked type for printing upon the face of the check. The machine in the drawings includes mechanism whereby when the printing mechanism is conditioned for printing upon the sales slips the check strip will be reversely moved to a position where, in case the keys should be operated without a sales slip in position, the impression from the type carriers will be made in the space usually printed upon by the printing roller. Then when the machine is changed to a check printing condition the check strip is restored to its normal relation with the printing and feeding rollers and subsequent operation of the feeding and printing mechanism will overprint or obliterate the incorrect type carrier impression, and the impression for the transaction upon which the check is issued will occur in the correct space on the check. This mechanism is part of the present invention claimed and while other mechanism has been shown more or less in detail no claims are made to it in this case.

The operating keys work in slots 20 (Fig. 1) in the machine casing and are pivoted on a rod 21 (Fig. 2) extending across the machine. Resting upon all of the keys is a key coupler 22 pivoted as at 23 in the side frames of the machine. When the outer ends of the keys are depressed the key coupler is rocked clockwise on its pivot and engages with notches 24 in the rear portions of the keys. The construction and purposes of such key coupler mechanism are well known in the art and need not be described in detail.

Connected to the key coupler is a double rack 25, the connection being such that as the key coupler 22 is rocked by the keys the rack 25 is raised and lowered. The teeth of the double rack engage a gear (not shown) secured to the shaft 27, first on one side and then on the other, in such a way that a complete movement of the key coupler 22 and double rack 25 will effect a complete rotation of the shaft 27. The shaft 27 carries cams and other devices for operating various parts of the mechanism. The mechanism for effecting rotation of the shaft has not been described in detail because it is old and so well known. Reference may be had to the patent to Carney 773,060, dated October 25, 1904 for a more full disclosure of suitable means for this purpose.

In the Fuller application cited above there was shown two keys which were designated as clerks' or departmental keys. For convenience they will be referred to as the A and B clerks' keys, the B key being shown in Fig. 1 and designated by reference character 32. They are connected with and operate mechanism for controlling engagement of either the totalizer A or the totalizer B, Fig. 1, with operating segments of the differential mechanism. The totalizer engaging mechanism is not directly involved in the present invention, and is not shown or described in this application. A showing and description of one form thereof may be found, however, in the Fuller application above mentioned.

The A key in addition to its totalizer selecting or engaging function operates an indicator and does certain other work, but is not connected to devices for setting a type carrier. The machine shown in the Fuller application has, however, a type carrier for printing either the letter A or the letter B and, in addition thereto, a similar type carrier is included in the improved mechanism. The position of these two type carriers is controlled by the B key 32.

Figure 3:
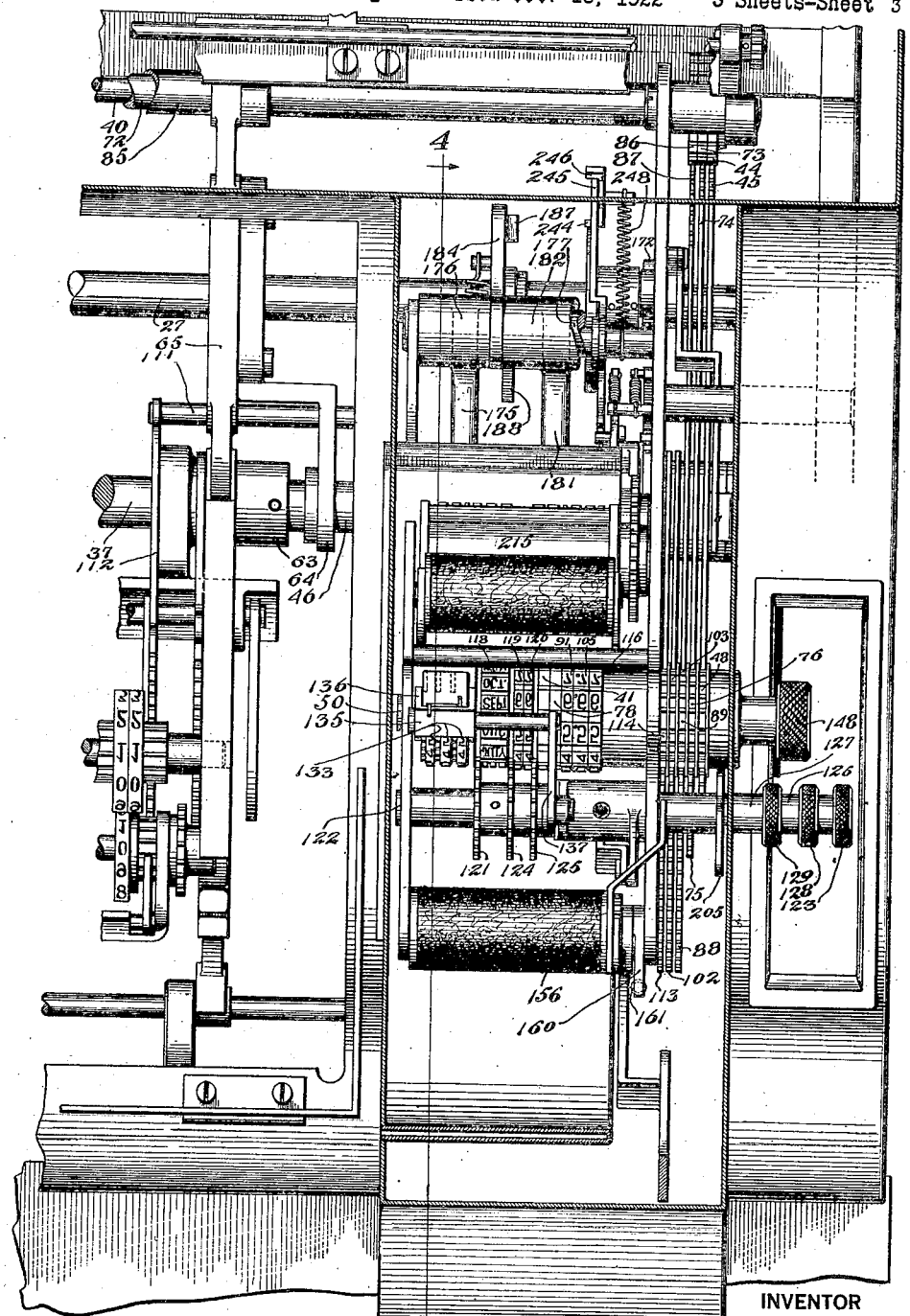
Fig. 3 is a top plan view of the improved printing mechanism and some of the operating connections and associated accounting mechanism.

As shown in Fig. 1 the B key 32 has an upwardly extending arm 33 carrying a stud 34 engaging a slot 35 in a member 36 loose on a shaft 37. The member 36 is connected by a link 38 with an arm 29 secured to a shaft 40 journaled in lugs on the back frame of the machine. It is apparent that when the B key 32 is depressed it will act through the connections described to rock the shaft 40 counter-clockwise (Fig. 1) and that when the key 32 returns to its undepressed position the shaft 40 will be restored to its starting point. This movement of the shaft 40 effects the setting of a type carrier 41 (Fig. 3) in the improved mechanism for printing either the letter A or the letter B. The A and B type carrier 42, Fig. 1, in the machine shown corresponds to the clerk's type carrier in the Fuller application before mentioned and is given a corresponding movement by connections which are neither shown nor described in the present case. The connections for transmitting movements of the shaft 40 to the new type carrier 41 mentioned above comprises a gear 44, (Fig. 3) secured to the shaft 40 and meshing with the teeth of a segment 45 (Figs. 3 and 5) loose on a shaft 46 in axial alignment with the previously mentioned shaft 37. An extension 47 of the segment 45 is provided with teeth meshing with the teeth of the gear 48 (Fig. 3) which is secured to a tube integral with the type carrier 41 provided with A and B type. In the machine illustrated in the Haas application four transaction keys for "Paid out", "Charge", "Received on account" and "No sale" items were shown. One of these transaction keys is shown in Fig. 1 and designated by the reference character 53. With the exception of the "No sale" key each transaction key is provided with an upwardly extending arm carrying a stud, similar to that shown in connection with the B key 32, engaging a slot in a plate 59 rigidly mounted in a frame 60 secured to the shaft 37. The shaft 37 is journaled at its left end in the left side frame of the machine and terminates at its right end at the point marked 62, Fig. 5. This point of termination is within a hub 63 secured to the shaft 46, previously mentioned, which shaft is rotatably supported by the right hand machine frame and by a bracket 64 on a frame 65 (see also Fig. 3), and which in the illustrative machine supports the totalizers and record strip printing mechanism. The reason for having the separate shafts 37 and 46 instead of a single shaft will be clear later on.

Secured to the shaft 37 is a segment 66 (Fig. 1) for setting the special transaction type carrier in the old recording mechanism for printing on the usual detail strip, and rigid with the frame 60 is a segment 67. The slots in the plates 59 carried by the frame 60 are graduated so that each of the keys will impart a different degree of movement to the frame and consequently to the segments 66 and 67.

The segment 67 meshes with a gear 71 secured to a tube 72 (Figs. 2 and 3) surrounding the shaft 40 and carrying at its other end a gear 73 meshing with a segment 74 loose on the shaft 46 and having a toothed portion 75 meshing with a gear 76 secured to a tube integral with a type carrier 78 having on its periphery type for printing characters to represent the various classes of transactions. From the foregoing it is clear that the differential movements of the frame 60 by the associated keys will effect corresponding movements of the type carrier 78 to its various printing positions.

In the machine of the Haas application above cited there is provided three groups of numeral keys, one group consisting of seven keys of the dollars registering bank, one group for the dimes bank and the remaining group for the cents bank. The connections whereby the differentially actuated frame associated with each bank sets up a type carrier for printing characters representing the value of the key depressed is shown clearly in the Haas application, but in order to understand the present invention the same will be briefly described in this application. For a fuller and more complete showing reference may be had to the application just cited.

The group of keys associated with the dollars bank are similar to the transaction keys and have associated therewith a differentially actuated frame, similar to the frame 60 for the transaction keys. Integral with this frame and meshing with a pinion secured to the tube 85, (Fig. 3) is a segmental rack, not shown in the present case since this rack and pinion are in all respect similar to segment 67 and pinion 71 for the transaction group of keys. Secured to the tube 85 is a pinion 86 meshing with the teeth of a segment 87 loose on the shaft 46. Rigid with the segment 87 is a segment 88 meshing with the teeth of a gear 89 attached to a tube the other end of the tube carrying a type carrier 91 for printing characters to represent the dollars.

The keys of the dimes bank have also associated therewith a differentially actuated frame, the left end of which frame is loosely mounted on the shaft 37 while the right hand end is integral with the hub 63 (Fig. 3) which, as before stated, is fast to the shaft 46. Rigid to the shaft 46 near its right end is a segment 102 (see also Fig. 5) meshing with a gear 103 (Fig. 3) connected by a tube to a type carrier 105 for printing characters representing the 10¢ to 90¢ amounts.

As in the case with the other groups of keys the penny keys have also associated therewith a differentially actuated frame. There are nine penny keys, two of them being shown in Fig. 2. This view also shows the upwardly extending arms 57 of the keys, studs 58 and the cam slots in the plates 109. These plates are fastened in a differential frame 110 in the same manner as hereinbefore described in connection with other groups of keys. Secured in extensions of the frame 110 is a rod 111 engaging a segment 112 (Fig. 3) loose upon the shaft 37. Secured to the right hand side of the differential frame 110 is a segment 113, Figs. 3 and 5, engaging a gear 114, Fig. 3, connected by a tube to a type carrier 116 for printing the characters representing 1¢ to 9¢.

In axial alignment with the type carriers 41, 78, 91, 105 and 116, are type carriers, 118, 119, and 120 (Fig. 3) for designating dates. Meshing with the teeth of a gear rigid with the type carrier 118 is a gear 121 secured to a shaft 122. At its right hand end the shaft is provided with a knurled knob 123 by means of which the type carrier 118 may be adjusted to the different positions. The printing face of the type carrier bears type for printing characters representing the months. The type carriers 119 and 120 are provided with similar gears 124 and 125 rigid with tubes 126 and 127 provided with setting knobs 128 and 129 by means of which the type carriers 119 and 120 may be adjusted to represent the various days of the month.

Mounted upon the shaft 50 and, therefore, in axial alignment with the other type carriers just mentioned are three type carriers 133, (Figs. 3 and 4) for printing the consecutive numbers upon the checks. These carriers and the mechanism for operating them are of the usual deep notch transfer type. A bail 135, Figs. 2, 3 and 4 loose upon the shaft 50 supports the usual operating and carrying pawl 136. One side of the bail 135 is connected by a link 137 (Fig. 4) to a bell crank 138 loose on the tube 127 and connected by a link 139, with an arm 140 loose on the shaft 141, but rigid with an arm 142. The arm 142 has a cam slot 143 engaging a stud 144 on the side of the check feeding lever 146. This lever, which has an operating handle 147, is moved each time that a check is issued and consequently acts through the stud 144, cam slot 143 and other connections described to oscillate the bail 135 a sufficient distance for the pawl 136 to add one on the consecutive numbering type carriers. Spring pressed pawls 151 retain the numbering carriers in their various positions.

The consecutive numbering type carriers may be turned to zero whenever desired by turning a knob 148 in the manner described fully in the Haas application.

Figure 2:
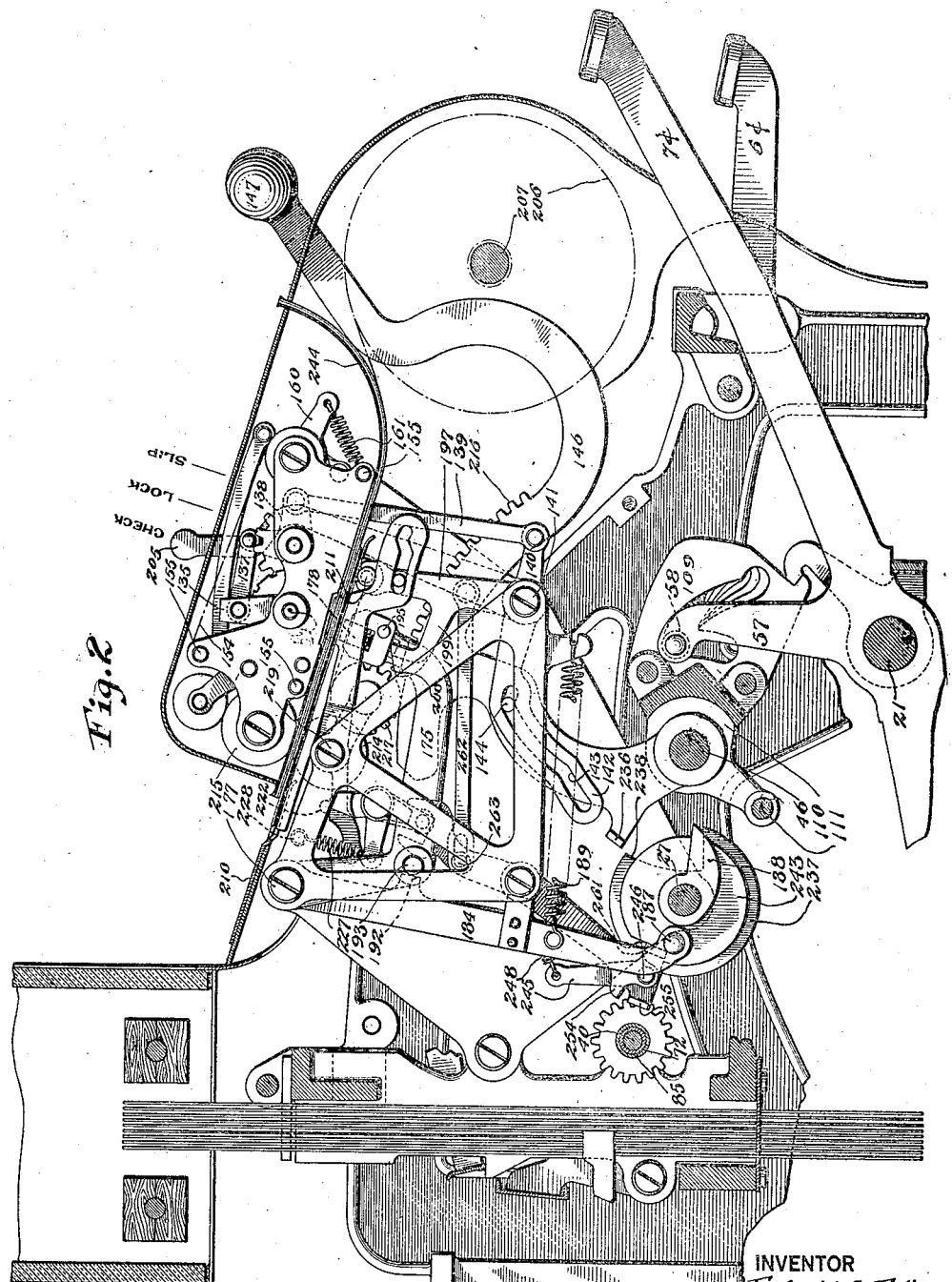
Fig. 2 is a section of the upper part of the machine taken through the cents bank of keys.

The ink for printing from the consecutive number type carriers and the other type carriers in axial alignment therewith is supplied by an inked ribbon 154, Figs. 2 and 4, passing below the type carriers around supporting rollers 155, and a roller 156 of felt or other material capable of carrying an ink supply for the ribbon. The roller 156 is rotatable on a rod 157 and pivoted on this rod at one end of the roller 156 is an arm 158 carrying another roller 159. Integral with the arm 158 is an arm 160 connected by spring 161 with the rod supporting the adjacent roller 155. The ribbon passes back of the roller 159 so that the spring 161 can serve to maintain a certain amount of tension upon the ribbon.

The ribbon is given a step of movement at each operation of the machine. This not only prevents successive impressions through the same portion of the ribbon, but it also serves to bring the different portions of the ribbon into contact with the roller 156 and thereby permits it to moisten or apply ink to the ribbon.

Any suitable mechanism may be provided, such as that shown in the Haas application for example for driving the ribbon so that different portions of the ribbon may be utilized during successive printing operations.

The impressions are taken from the consecutive number, date and item carriers by two percussion hammers, one for the consecutive number, and the other to print the date and amount. The consecutive number hammer 175, (Figs. 2, 3 and 4) has a hub 176 loose on a rod 177. At its forward end it carries an adjustable impression block 178 of rubber or other suitable material of sufficient length to take an impression from all three of the consecutive number type carriers. The impression hammer 181 (Fig. 3) for printing from the rest of the type carriers is substantially the same as the consecutive type hammer, and has a hub 182 loose on the rod 177. At its forward end the hammer 181 carries an impression block which is not shown in the drawings, but is the same as the impression block 178 previously described, except that it is enough longer to print from all of the date and item printing type carriers.

Printing movement is imparted to the impression hammers by an arm 184 pivoted on the rod 177 between the impression hammer hubs 176 and 182. The forward edge of the arm 184 has a shoulder 185 engaging a rod 186. Near its lower end the arm 184 carries a stud 187 in the plane of rotation of a cam 188 fastened to the rotation shaft 27. During the rotation of the shaft the cam will act against the stud 187 to swing the arm 184 against the tension of a spring 189 until the cam passes out of engagement with the stud whereupon the spring 189 will snap the arm 184 forward until it is arrested by the rod 186. The arm 184 has a portion 192 extending at right angles to its length and engaging a stud 193 on each of the hammer arms. As best shown in Fig. 4, the hammer normally rest with their studs in engagement with the right angle portion 192 of the impression hammer operating arm 184 and in this normal position the impression blocks in the hammers are at some little distance from the type carriers. When the hammer operating arm 184 is swung by the cam 188 the hammers will follow and when the cam releases the arm both of the hammers will be thrown against their type carriers to take impressions.

The mechanism previously mentioned whereby the impression hammer 175 may be prevented from printing or by which under certain conditions both hammers may be disabled, performs its function by movement of the hammer or hammers toward the type carriers far enough to carry the studs 193 out of engagement with the normally co-acting portion 192 on the hammer operating arm 184 and holds them in that position. With this in view the consecutive number hammer head is provided with a stud 195, Fig. 2, and the other hammer with a stud 196, Figs. 2 and 4. Attached to the shaft 141 is a pair of arms 197 and 198, (see also Figs. 5 and 6). The arm 197 has an extension 199 having a cam surface 200 to engage the stud 195 while the arm 198 has a similar extension 201 and cam surface to engage the stud 196. Secured to the shaft 141 is a controlling lever 205 which, as shown in Fig. 10, is adjustable to three positions, marked respectively, Check, Lock and Slip. The construction and relation of the parts is such that when the controlling lever 205 is at the check position neither the stud 195 or the stud 196 will be engaged by the cam surfaces on the arms 199 and 201 and the hammer operating arm 184 will, when it snaps forward, impart printing movement to both of the hammers. When the controlling lever 205 is moved to the lock position the cam surface on the arm 201 will be brought into engagement with the stud 196 on the date and amount hammer 181 and the cam surface 200 will be brought into engagement with the stud 195 on the consecutive number hammer 175. The cam surfaces are so graduated that they will act against their associated studs to move the hammers towards the type carriers far enough to hold the studs 193 on the hammers out of engagement with the operating portion 192 of the hammer operating arm 184. As a result neither of the hammers will be operated to make an impression.

When the lever 205 is moved to the slip position the cam surface on the arm 201, which surface is comparatively short, will be carried past the associated stud 196 while the cam surface 200 of the arm 201 will, because of its greater length, remain in engagement with the stud 195 and hold the consecutive number hammer 175 in its inoperative position, and when the hammer operating arm 184 is released by the cam 188 only the date and amount hammer 181 will print.

The checks printed and issued by the machine are drawn from a roll 206 (Figs. 2 and 4) of paper or other suitable material, loosely supported by a stud 207. The strip passes from the roll 206 between plates 208 and 209, (Figs. 6 and 7), moving together and slidably supported at the rear end by a plate 210, attached to the machine casing. At its forward end the plates are supported by a rod 211 engaging slots at the upper ends of the arms 197 and 198 previously mentioned. As shown in Fig. 7, between the two plates is a leaf spring 212 which acts with the upper plate 209 to provide a tension device for preventing accidental movement of the paper relative to the plates. As previously pointed out, the arms 197 and 198 are moved by operation of the control lever 205 and owing to the engagement of the arms with the rod 211 any movement of the control lever and arms will be transmitted to the check paper table or chute and this movement owing to the tension spring 212 will serve to shift the check strip. The purpose of this shifting movement of the strip will be pointed out later on.

In most places of business, checks, or, as they are sometimes called, receipts, will be required in by far the larger number of transactions entered in the machine. When a check has been fully ejected by operation of the mechanism it is torn off from the strip, the rear edge 213 of the plate 209 serving satisfactorily as a tearing guide. The next check to be issued will therefore have one end adjacent the tearing edge 213 and will rest between a roller 214 and a roller 215 having on its periphery type for printing any desired matter. In the present machine the type is designed to print the name and address of the proprietor. The rollers 214 and 215 are geared together and are driven by movement of the check feeding lever 146. The feeding lever carries a segmental rack 216, which, during movement of the lever, will engage a gear 217 (Fig. 4) loosely mounted on an arm 218 loose on the shaft 219 which supports the roller 214. A spring (not shown) acts upon the arm to hold it in engagement with a pin 222. When the handle 147 is swung rearward the rollers 214 and 215 will be given a complete rotation and during the return movement the teeth of the gear 217 will ratchet over the teeth 216, because the rollers and the gear 217 will be held against reverse movement by a locking pawl 225, Figs. 4 and 11, integral with an arm 226 connected by a spring 227 with a pin 228 on the machine frame.

A full stroke mechanism is provided to compel a complete movement of the lever 146 and its handle 147 in both directions. This full stroke mechanism comprises a plate 233, Fig. 4, attached to the feeding lever or handle and concentric with the teeth 216. Pivotally supported on a stud 234, (Figs. 4 and 11), is a short arm 235. As the segment 233 travels to the right, Fig. 4, the arm 235 will be swung slightly on its pivot and then act with the notches in the segment to prevent reverse movement of the handle. At the end of the check feeding stroke of the handle the arm 235 will drop in front of the rack 233 and then during the forward movement of the handle will be swung the other way and co-operate with the rack to prevent movement of the handle in the other or feeding direction until after the movement back to its normal starting point has been completed.

The feeding lever 146 and the shaft 27 are provided with co-acting means preventing operation of the keys if the feeding handle 147 is shifted from its normal or home position, and which will, on the other hand, prevent movement of the feeding handle if a key has been partially depressed and the shaft therefore given partial rotation. In the present embodiment this co-acting means consists of a lug 236, (Fig. 4), extending laterally from the side of the feeding lever or handle and a disk 237 fastened to the shaft 27. When the shaft is in its normal position, the position in which it is shown in the figure last mentioned, a cutaway portion 238 will be in the path of the lug 236. This cutaway portion is concentric with the shaft 46 and when the feeding handle is operated the lug 236 will travel down until it is arrested by the portion 241 on the disk. It is apparent that rotation of the shaft 27, and, of course, operation of the keys of the machine will be prevented until the feeding handle is returned far enough to carry the lug 236 out of the path of the portion 238 of the locking disk. It will also be apparent that when the shaft begins its rotation the periphery of the disk 237 will be carried under the lug 236, thereby preventing any movement of the feeding handle 237 until the rotation of the shaft 27 is nearly completed.

In addition to the mechanism just described whereby the operation of the feeding handle 147 is prevented after the rotation shaft 27 has begun its movement, and vice versa, the machine has mechanism for controlling the sequence of operation of the keys and feeding handle. This mechanism is best shown in Figs. 2 and 4. In both figures the parts are all shown in the positions they occupy after an operation of the keys with the machine in check printing condition. At this stage the shaft 27 is held against rotation by a shoulder 242 on a disk 243 attached to the shaft engaging a lug 244 on an element 245 pivoted at 246 to the side of a lever 247 journaled on the rod 186. A spring 248 tends at all times to rock the element 245 in a clockwise direction on its supporting pivot. Disengagement of the lug 244 from the shoulder 242 is effected by rocking the lever 247 on its pivot 186 thereby swinging the lower end of the lever and the element 245 far enough to release the disk 243 and shaft 27.

This movement of the lever 247 is imparted during the return stroke of the feeding handle 147. The means for effecting it comprises an arm 251, see also Fig. 11, rigid with the full stroke arm or pawl 235 and provided with a stud 252 extending into an open slot 253 in the upper end of the lever 247. The slot is of sufficient width to permit an idle movement of the arm 251 and stud 252 during the feeding movement of the handle 147, but when the return movement of the handle begins and the full stroke rack 233 engages and swings the pawl 235 and the arm 251 counter-clockwise the stud 252 engages the forward side of the slot 253 and rocks the lever 247 far enough to disengage the locking lug 244 from the shoulder 242. When the lug and shoulder become disengaged the spring 248 will swing the element 245 until it is arrested by the engagement of a lug 255 thereon with a shoulder 254 on the lever 247. In this position the locking lug 244 will rest upon the periphery of the disk 243, thereby holding the lever 247 in such a position that the rear side of the slot 253 will be in engagement with the stud 252 and hold the full stroke pawl 235 in a position where it will block the movement of the full stroke rack 233 and, of course, the feeding handle or lever.

After the feeding handle 147 has been given a full to and fro movement to feed a check, and the shaft 27 freed for rotation, the keys may be depressed to register the next item. During this registration the shaft 27 will be given its usual complete rotation. Near the end of its rotation the shoulder 242 will engage the locking lug 244 and swing the element 245 to the position in which it is shown. Movement beyond this position is prevented by engagement of the locking lug 244 with a shoulder 261.

During rush hours it may be desirable to be able to use the registering keys without being compelled to operate the check feeding handle 147 and no operation of the handle is required in printing upon an inserted sales slip. It is necessary therefore to be able to disengage the locking lug 244 from the shoulder 242 and hold them disengaged when the printing is discontinued or when the machine is changed from check printing to sales slip printing condition. The mechanism for doing this includes a link 262 slotted at one end to engage a stud 263 on the lever 247 and pivoted at its other end to the arm 198. As previously pointed out this arm 198 is attached to the shaft 141 and therefore moves with the printer controlling lever 205. When the lever 205 is moved from the check position in which it is shown in all of the drawings to the lock position 264, (Fig. 10), the link 262 will draw the upper end of the lever 247 forward and disengage the locking lug 244 from the shoulder 242. Movement of the controlling lever 205 still further to the slip printing position 265 will result in added movement of the lever 247, and thereby simply carry the locking lug 244 still further away from the path of the shoulder 242. It is clear, therefore, that with the controlling lever 205 set at either the locking position 264 or the slip printing position 265 the keys and the rotation shaft 27 driven thereby are all free for operation without its being necessary to manipulate the check feeding handle 147.

In addition to its other functions, the printer controlling lever 205 also controls a lock for preventing any movement of the feeding handle 147 when the controlling lever is in either the lock or the slip position. This lock includes an arm 266 secured to the shaft 141 and provided with a slot 267 which is so constructed that it will engage a stud 268 on the side of the feeding lever 146 when the controlling lever 205 is moved to either the lock or the slip position. Normally, that is, when the lever 205 is at the check position, the stud 268 will travel along the curved edge 271 of an extension 272 of the arm 266. The purpose of the extension 272 is to prevent shifting the controlling lever 205 to either the lock or the slip position if the check paper feeding handle 147 is away from its normal starting position, as any attempt to move the controlling lever will then be opposed by engagement of the extension 272 with the stud 268.

When the control lever 205 is moved to the slip printing position the shaft 141 to which the lever is secured will be rocked. As aforesaid, the arms 197, 198, are moved by the operation of the control lever 205, and owing to the engagement of the rod 211 connected to the check paper table 208 with the arms 197, 198, any movement of the control lever and arms will be transmitted to the check paper table. It will also be recalled that a spring 212 (Fig. 7) acts upon the paper in such a manner that the check paper will move at all times with the table. Thus, when the lever is moved to the slip printing position the check table will be moved to draw the check paper back from between the co-operating rollers 214, 215. As will be seen by referring to Fig. 4 the rollers are cut away at 280 so that at their normal position this movement of the paper may be effected.

If now a transaction involving the receipt of cash, by clerk A, for $5.47 on Sept. 11, should be entered into the machine with the control lever 205 at the slip position and without a slip being inserted within the slot 274, the impression hammer 181 will be actuated to print the date identifying characters and amount of the transaction upon the check strip in substantially the center of the check paper, as seen in Fig. 9. This figure also shows the imprint of the name of the proprietors, John Doe & Co. in the present instance. This has been printed by the electro on the roller 215 during the last part of the operation of the previous check issuing operation. It will also be recalled that the impression hammer for the consecutive number type is rendered inoperative when the control lever is in the slip printing position so that the consecutive number will not appear upon such a check.

If now clerk B enters a cash transaction for $7.47 and wishes a check he will move the control lever to the check printing position, thus restoring the check strip to its normal relation with the rollers 214, 215, and then depress the proper operating keys. Since two amounts will now appear upon the same check confusion would result and it is therefore desirable to cancel or delete the record of the previous transaction. The type on the electro are so positioned that upon a subsequent impression from the rollers the type carried thereby will overprint or cover the impression erroneously made on the check during the previous operation. At the same time the identifying characters, amount, date and consecutive number of the present transaction will appear in the correct space, on the issued check as shown at 282 in Fig. 8. This figure also shows at 281 the way in which such an incorrect transaction is overprinted and obliterated. The wording of the type which overprints the incorrect transaction is merely illustrative and the size and configuration of the type may, if desired, be changed in any manner so that an impression from them will dominate and substantially conceal the presence of the impression from the other type.

In describing the construction of the improved machine it has been necessary incidentally to describe the operation of the various features to such an extent that it is thought that the usual summary of the operation of the machine may be omitted.

While the embodiment herein shown and described is well adapted to fulfill the objects above stated, it is not the intention to limit the invention to the one form, as it is capable of various modifications and changes all coming within the scope of the claims which follow.

What is claimed is:

1. In a machine of the class described, the combination with a plurality of operating keys, type carriers, printing hammers for effecting printing impressions, manipulative means for conditioning the machine for either check or slip printing, and means for obliterating an impression made upon the check when the machine is in the slip printing position without a slip inserted, said check being issued upon a subsequent operation of the machine when conditioned for check printing.

2. In a machine of the class described, the combination of a plurality of operating keys, type carriers, printing hammers for effecting printing impressions, a check strip, manipulative means for conditioning the machine for either check or slip printing, means under the control of the manipulative means for positioning the check strip so as to receive a printing impression when the machine is operated in a slip printing condition without a slip inserted, and to restore the same to its original position to receive a second impression adjacent to the first impression when the machine is conditioned for check printing.

3. In a machine of the class described, the combination of a plurality of operating keys, type carriers, printing hammers for effecting printing impressions, a check strip, manipulative means for conditioning the machine for either check or slip printing, means under the control of the manipulative means for positioning the check strip so as to receive a printing impression when the machine is operated in a slip printing condition without a slip inserted, and to restore the same to its original position to receive a second impression adjacent to the first impression when the machine is conditioned for check printing, and means for obliterating the first impression.

4. In a machine of the class described, the combination of a plurality of operating keys, type carriers, printing hammers for effecting printing impressions, a check strip, feeding and printing rollers, manipulative means for conditioning the machine for either check or slip printing, means under the control of the manipulative means for reversely moving the check strip from co-operation with the feeding and printing rollers, so as to receive a printing impression when the machine is operated in a slip printing condition without a slip inserted, and to restore the same to its original position to receive a second impression adjacent the first impression when the machine is conditioned for check printing, and means formed on the printing roller for obliterating the first impressions.

5. In a machine of the class described, the combination with a plurality of operating keys, type carriers associated therewith, printing hammers for effecting printing impression, a check strip, feeding and printing rollers co-operating with the check strip, a manually operable mechanism for driving said rollers, manipulative means for conditioning the machine for check or slip printing, means under control of the manipulative means for reversely moving the check from co-operation with the feeding and printing rollers so as to receive a printing impression when the machine is operated in a slip printing condition and without a slip inserted, and to restore the same to its original position to receive a second impression adjacent the first impression when the machine is conditioned for check printing, and means formed on the printing roller for obliterating the first impression when the check is issued by operating the manually operable driving mechanism.

6. In a machine of the class described, the combination with a plurality of keys, a set of type carriers associated therewith, a check strip contained within the machine casing, printing hammers to effect printing impressions upon the check strip from the type carriers, a control lever movable to a plurality of positions for conditioning the machine for slip or check printing, a movable table carrying the check strip and connections between the check table and the control lever for moving the check table and control lever in unison.

7. In a machine of the class described, the combination with a slidable check table carrying a check strip, a casing, a slot within the casing to receive inserted slips, a control lever adapted to be moved to a plurality of positions to condition the machine for check or slip printing and connections whereby the check table and control lever move in unison, and means comprising a spring bearing against the paper for insuring the simultaneous movement of the check paper and check table.

8. In a machine of the class described, the combination with a casing provided with a slot to receive inserted sales slips, of a movable check table carrying a check strip, printing mechanism within the casing for printing and issuing checks or printing upon sales slips, a manually adjustable lever for adjusting the printer to print upon checks or upon sales slips, and connections whereby the check table may be moved by adjustment of the lever.

9. In a machine of the class described, a printing mechanism constructed to print items on checks or on inserted sales slips, manipulative devices for conditioning the printing mechanism for either check or slip printing, and means controlled by said manipulative devices for shifting the check material relative to the printing mechanism from a normal to an abnormal position when the printing mechanism is conditioned for sales slip printing.

10. In a machine of the class described, a printing mechanism constructed to print variable matter on checks or on inserted sales slips and invariable matter on the checks manipulative means for conditioning the printing mechanism for either check or slip printing, devices whereby variable matter printed on a check when the printer is in slip printing condition will be overprinted by the invariable matter at the next succeeding operation under check printing condition, and connections whereby the manipulative means controls said devices.

11. In a machine of the class described, the combination of a printing mechanism comprising a pair of paper feeding rollers, of devices for shifting the paper reversely away from and holding it out of the range of movement of the feeding rollers, printer controlling mechanism comprising manually operable devices, and connections whereby said manually operative devices also control the paper shifting devices.

12. In a machine of the class described, the combination of a printing mechanism comprising a paper feeding mechanism, of devices for shifting the paper reversely away from and retaining it out of the range of movement of the feeding rollers and for returning it to its original position, printer controlling and operating mechanism comprising manually operable devices, and connections whereby said manually operable devices also control the paper shifting devices.

13. In a machine of the class described, a series of printing wheels, means adjacent thereto for feeding a record strip in one direction across said wheels, manual means for operating said feeding means to advance said strip by steps, and a manipulative device for causing said strip to shift in the opposite direction.

14. In a machine of the class described, a series of printing wheels, means adjacent thereto for feeding a record strip in one direction across said wheels, manual means for operating said feeding means to advance said strips by steps, and a manipulative device for causing said strips to shift first in the opposite direction and then in the same direction as by said manual means.

15. In a machine of the class described, a series of printing wheels, means adjacent thereto for feeding a record strip in one direction across said wheels, manual means for operating said feeding means to advance said strip by steps, a manipulative device for causing said strip to shift in the opposite direction, and connections for preventing operation of said manual means when said strip has been shifted by said manipulative device.

16. In a machine of the class described, a series of printing wheels, means adjacent thereto for feeding a record strip in one direction across said wheels, manual means for operating said feeding means to advance said strip by steps, a manipulative device for moving said record strip in both directions and connections for preventing operation of said manual means to advance the strip when said strip has been shifted in the reverse direction by said manipulative device.

17. In a machine of the class described, a plurality of printing elements, means for feeding a record medium to receive successive impressions at spaced intervals from said elements, and a second means for shifting said record strip when it is not intended to receive an impression.

18. In a machine of the class described, a plurality of printing elements adapted to print either on an inserted slip or an issuing check strip, a control member for determining whether an inserted slip or the check strip shall receive an entry, means for feeding the check strip, means controlled by said control member when in one position to prevent the insertion of a slip, and means whereby movement of said member to another position will shift the check strip out of normal printing position and simultaneously disable the normal check strip feeding means and permit the insertion of a slip.

In witness whereof I have signed my name hereto this 10th day of October, 1922.

FREDERICK L. FULLER.